United States Patent [19]

Vaahs et al.

[11] Patent Number: 4,952,670

[45] Date of Patent: Aug. 28, 1990

[54] POLYMERIC HYDRIDOTHIOSILAZANES, PROCESSES FOR THE PREPARATION THEREOF, SILICON NITRIDE-CONTAINING CERAMIC MATERIALS WHICH CAN BE PREPARED THEREFROM, AND THE PREPARATION THEREOF

[75] Inventors: Tilo Vaahs, Kelkheim; Hans-Jerg Kleiner, Kronberg; Marcellus Peuckert; Martin Brück, both of Hofheim am Taunus, all of Fed. Rep. of Germany

[73] Assignee: Hoechst Aktiengesellschaft, Frankfurt am Main, Fed. Rep. of Germany

[21] Appl. No.: 290,627

[22] Filed: Dec. 22, 1988

[30] Foreign Application Priority Data

Dec. 23, 1987 [DE] Fed. Rep. of Germany ....... 3743826

[51] Int. Cl.$^5$ ............................................. C08G 77/20
[52] U.S. Cl. ...................................... 528/32; 525/474; 528/33; 528/37; 528/38; 501/92
[58] Field of Search ....................... 528/32, 33, 37, 38; 525/474

[56] References Cited

U.S. PATENT DOCUMENTS

| | | | |
|---|---|---|---|
| 4,397,828 | 8/1983 | Seyferth et al. | 423/344 |
| 4,482,669 | 11/1984 | Seyferth et al. | 524/442 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,722,988 | 2/1988 | Porte et al. | 525/474 |
| 4,818,611 | 4/1989 | Arai et al. | 428/364 |

OTHER PUBLICATIONS

R. R. Wills et al., Ceramic Bulletin, 62, 904–915, (1983).
K. Ruehlmann et al., Z. Chem., 5, 107, (1965).

*Primary Examiner*—Melvyn I. Marquis

[57] ABSTRACT

Polymeric hydridothiosilazanes, processes for the preparation thereof, silicon nitride-containing ceramic materials which can be prepared therefrom, and the preparation thereof.

The invention relates to novel polymeric hydridothiosilazanes, the preparation thereof, the conversion thereof into silicon nitride-containing ceramic material, and this material itself. To prepare the polymeric hydridothiosilazanes, oligohydridoalkylsilazanes $(RSiHNH)_n$ are reacted with elemental sulfur and ether as solvents. The polymeric hydridothiosilazanes can then be pyrolyzed to form silicon nitride-containing ceramic material.

8 Claims, No Drawings

POLYMERIC HYDRIDOTHIOSILAZANES, PROCESSES FOR THE PREPARATION THEREOF, SILICON NITRIDE-CONTAINING CERAMIC MATERIALS WHICH CAN BE PREPARED THEREFROM, AND THE PREPARATION THEREOF

The invention relates to novel polymeric hydridosilazanes which contain chemically bound sulfur (also called "polymeric hydridothiosilazanes" below), the preparation thereof, their conversion into silicon nitride-containing ceramic material, and this material itself. The silicon nitride-containing ceramic material is obtained from the polymeric hydridothiosilazanes by pyrolysis and predominantly comprises silicon nitride containing some silicon carbide and carbon.

Pyrolysis of polysilazanes to form form silicon nitride-containing ceramic material has already been described in the literature (R. R. Wills et al., Ceramic Bulletin, Vol. 62 (1983), 904–915).

To prepare polysilazanes, chlorosilanes are generally employed as the starting materials and are reacted with ammonia or primary or secondary amines (U.S. Pat. Nos. 4,540,803, 4,543,344, 4,595,775, 4,397,728 and 4,482,669). According to U.S. Pat. No. 4,482,669, a dichlorohydridoalkylsilane of the formula $RSiHCl_2$ is reacted with $NH_3$ to form oligohydridoalkylsilazanes $(RSiHNH)_n$, which are then condensed, for example with the aid of KH with elimination of hydrogen, to form polysilazanes.

The present invention makes available novel starting materials for silicon nitride-containing ceramic materials, namely polymeric hydridothiosilazanes.

The present invention relates to a process for the preparation of polymeric hydridothiosilazanes, which comprises reacting oligohydridoalkylsilazanes of the general formula $(RSiHNH)_n$ in which n is approximately 3 to 12 and R is $C_1$–$C_6$-alkyl or $C_2$–$C_6$-alkenyl, with elemental sulfur in an ether as solvent at 30° to 120° C. The reaction is preferably carried out at 60° to 80° C.

The oligohydridoalkylsilazanes $(RSiHNH)_n$, employed as starting materials, where n is approximately 3 to approximately 12, can be obtained by reacting a dichlorohydridoalkylsilane of the formula $RSiHCl_2$ where R is as defined above, with excess $NH_3$ in a solvent, as described in U.S. Pat. No. 4,482,669 (therein see, in particular, columns 4, 5, 7 and 8). In this reaction, a mixture of linear and cyclic oligomers of various chain lengths n is generally produced.

R is preferably methyl or vinyl. The oligohydridoalkylsilazanes $(RSiHNH)_n$ are also abbreviated to "oligosilazanes" below.

The molar ratio between sulfur and the RSiHNH unit of the oligosilazane is preferably approximately 0.1 : 1 to 1:1, in particular 0.6:1 to 0.8:1 in the preparation of the polymeric hydridothiosilazanes.

In order to react the reactants with one another, the oligosilazanes are initially introduced in an ether as solvent, and the sulfur is added.

The reaction duration depends on the reaction temperature. In general, a reaction time of from 1 to 7 hours is sufficient. Suitable solvents are ethers, such as THF, diethylene glycol diethyl ether etc.

The polymeric hydridothiosilazanes according to the invention are then obtained by removing the solvent by distillation under reduced pressure.

If desired, the process can also be carried out under reduced pressure. It is also possible to use pressures in the range 1 to 10 atmospheres.

The sulfur is generally added in portions. It dissolves in the solution of the oligosilazane, on which it initially imparts a yellow coloration. This coloration disappears again to the extent to which the sulfur reacts with the oligosilazanes. In this case, 40 to 60 % of the sulfur employed are incorporated into the resultant polysilazane, while the rest escapes as hydrogen sulfide.

K. Rühumann et al. (Z. Chem. 5 (1965) page 107) report on the preparation and isolation of the oligosilazanes triisopropylcyclotrisilazane 1 and tetraisopropylcyclotetrasilazane 2. In addition, dehydrogenation experiments were carried out using these compounds and were summarized in the following way without further data: "Experiments on dehydrogenation of 1 and 2 using sulfur, selenium and platinum on activated charcoal resulted in formation of brittle, benzene and ether-soluble resins with elimination of hydrogen and ammonia."

In contrast, $H_2S$ is formed in place of $H_2$ and $NH_3$ in the reaction according to the invention of oligosilazanes with sulfur, which is carried out in ethers as solvents. This clearly shows that another reaction route is followed, which is why the reaction products of the process according to the invention differ fundamentally from those of the literature cited in structure, and thus in the physical and chemical properties.

The novel polymeric hydridothiosilazanes prepared have a molecular structure which can be represented by the formula

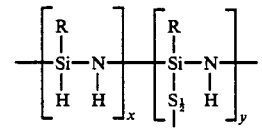

R = $C_1$–$C_6$-alkyl or $C_2$–$C_6$-alkenyl
x + y = 1.

In this formula, the value of y is a measure o& the sulfur content of the polysilazane. The silicon atoms here are not bonded directly to one another, but instead via NH groups or S atoms. The Si:N ratio in the polymeric hydridothiosilazanes is approximately 1:1 to 1.2:1.

Accordingly, the present invention furthermore relates to polymeric hydridothiosilazanes of the formula

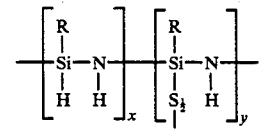

where R is $C_1$–$C_6$-alkyl or $C_2$–$C_6$-alkenyl and x and y denote the molar fractions of the two structural units.

The greater the ratio between sulfur and the RSiHNH unit of the oligosilazane, the higher the value of y (and correspondingly the lower the value of x). The values of x and y present in each case can be determined by integration of the $^1H$ NMR spectra and by elemental analysis. Preferred polymeric hydridothiosilazanes are those in which the values for y are 0.6 to 0.8, in particular 0.7 to 0.8. As stated, these values can be adjusted via the relative content of sulfur in the reaction mixture and can be checked via the analytical methods mentioned. The preferred values for x and y just mentioned have proven particularly successful if the reaction is to produce a solid, soluble polyhydridothiosilazane as the end product. This prerequisite is necessary if shaping to monoliths, fibers etc., is intended.

The invention furthermore relates to polymeric hydridothiosilazanes which are obtainable by reacting oligohydridoalkylsilazanes of the general formula $(RSiHNH)_n$ in which n is approximately 3 to approximately 12 and R is $C_1$–$C_6$-alkyl or $C_2$–$C_6$-alkenyl, with elemental sulfur in an ether as solvent at 30° to 120° C.

The novel polymeric hydridothiosilazanes (also abbreviated to "polyhydridothiosilazanes") can be converted into polyhydridosilazanes by reaction with ammonia ("ammonolysis"); these polyhydridosilazanes can in turn be converted into silicon nitride-containing ceramic material by pyrolysis.

The ammonolysis can be carried out in liquid $NH_3$. However, it is advantageous to carry it out in an organic solvent. All solvents which are inert to the polyhydridothiosilazanes are suitable. Preferred solvents are those in which the ammonium sulfide produced as a byproduct has low solubility and good separability, for example ethers, aliphatic and aromatic hydrocarbons, and chlorinated hydrocarbons. The reactants can be introduced into the reaction vessel in any sequence during the ammonolysis. However, it is usually advantageous to initially introduce the polyhydridothiosilazane in solution and to introduce gaseous ammonia or to add to liquid ammonia. If the polyhydridothiosilazanes according to the invention have been prepared in a suitable organic solvent, the ammonolysis can subsequently be carried out in this solvent and without isolation of the polyhydridothiosilazane. The ammonolysis is preferably carried out using an excess of $NH_3$ in order to ensure that the reaction is complete and that the end products are as free as possible from sulfur. In general, twice the stoichiometric amount is sufficient for this purpose, the stoichiometric amount being 3 moles of $NH_3$ per mole of S.

In general, the reaction is carried out at a temperature of from approximately −50° to +100° C., preferably −20° to +30° C., in particular at room temperature (with ice cooling). However, it is also possible to carry out the reaction above room temperature, for example at the boiling point of the solvent used, or below room temperature, for example at −33° C. when liquid $NH_3$ is used.

When the ammonolysis is complete, the excess $NH_3$ is removed, if necessary, and the ammonium chloride produced is filtered off. In order to increase the yield, the precipitate can be washed with one of the above-mentioned organic solvents. After removing the solvent by distillation at reduced pressure, the polyhydridosilazanes are obtained directly as a white powder. The polyhydridosilazanes are soluble in the above organic solvents, which means that they can be used both for coating surfaces and for the production of fibers.

The polyhydridosilazanes can be pyrolyzed in an inert atmosphere at temperatures of from 800 to 1200° C. to form amorphous, dense materials which essentially comprise Si, N and C and may also contain traces of H and 0. The inert atmosphere here may comprise $N_2$, Ar or He, but $N_2$ or Ar is preferably used. At pyrolysis temperatures of greater than 1200° C., for example in the range of 1200° C. to 1400° C., partially amorphous, microcrystalline ceramic materials containing $\alpha$-$Si_3N_4$ as the crystalline phase are produced.

A particular advantage is that the polyhydridosilazanes can, before pyrolysis, be shaped into three-dimensional shaped articles by various processes.

An important method of shaping is the drawing of fibers. Fibers can be drawn from high-viscosity solutions of the polyhydridosilazane in solvents, such as toluene, THF or hexane. The fibers are advantageously drawn by means of spinnerets 80 to 150 μm in diameter. The filament is tapered by subsequent stretching, so that a very strong filament 2 to 20 μm, in particular 5 to 15 μm in diameter is produced after pyrolysis. The fibers produced by subsequent pyrolysis are used as mechanical reinforcing inclusions in fiber-reinforced aluminum, aluminum alloys and ceramic components.

A further important way of processing the polyhydridosilazanes is the production of impermeable, highly adherent, amorphous or microcrystalline ceramic coatings on metals, in particular steels, or on ceramics such as $Al_2O_3$, $ZrO_2$, MgO, SiC or $Si_3N_4$. The coating is produced with the aid of a solution of the polyhydridosilazane in organic solvents, such as toluene, THF, hexane. Pyrolytic conversion into an amorphous or microcrystalline coating is carried out in the same temperature range of from 800° to 1200° C. or 1200° to 1400° C. under an inert gas, as described above in the case of three-dimensional shaped articles.

Due to their excellent adhesion, great hardness and surface quality, the ceramic coatings are particularly suitable for surface-finishing of machine components which are subjected to mechanical load and chemical attack.

In addition, the above-described polyhydridosilazanes can also be pyrolyzed in an $NH_3$ atmosphere instead of in an inert gas in an equally high ceramic yield of 70 to 90%. This results in a virtually carbon-free, glass-clear, colorless material. In the case of pyrolysis in $NH_3$ at 1000° C. or higher, the C content is less than 0.5% by weight. Depending on the pyrolysis temperature, the pyrolysis product comprises virtually pure amorphous silicon nitride (pyrolysis at less than 1200° C.) or crystalline $Si_3N_4$ (pyrolysis at greater than 1200° C., in particular greater than 1300° C.). Pyrolysis in $NH_3$ can be used for all shaped articles produced by the above-described shaping processes, i.e. articles, fibers and coatings formed from powders.

However, the polymeric hydridothiosilazanes can also be pyrolyzed directly—instead of first converting the polymeric hydridothiosilazanes into sulfur-free polyhydridosilazanes and then converting the latter into silicon nitride-containing ceramic materials—likewise giving silicon nitride-containing ceramic materials.

The invention therefore furthermore relates to a process for the preparation of silicon nitride-containing ceramic material, which comprises pyrolyzing the polymeric hydridothiosilazanes defined above by means of their structural formula or by means of the process for their preparation, in an inert atmosphere at 800° to 1400°.

However, it is more favorable to carry out this pyrolysis in an $NH_3$ atmosphere instead of in an inert atmosphere. In this case, silicon nitride-containing ceramic material is likewise obtained. The same applies to pyrolysis of the polymeric hydridothiosilazanes in an $NH_3$ atmosphere as was stated above for pyrolysis of the polyhydridosilazanes (which can be prepared from the polymeric hydridothiosilazanes by reaction with NH$_3$, i.e. ammonolysis). The polymeric hydridothiosilazanes can be shaped, before pyrolysis, to form three-dimensional shaped articles by various processes. In particular, silicon nitride-containing ceramic fibers or coatings can be produced by initially dissolving the polymeric hydridothiosilazanes in an organic solvent, such as toluene, THF or hexane, then drawing fibers or producing a coating, and pyrolyzing the latter in an NH$_3$ atmosphere after evaporation of the solvent. Amorphous Si$_3$N$_4$ is again obtained at 800° to 1200° C. and crystalline Si$_3$N$_4$ at 1200° to 1400° C.

Experimental report:

Preparation of oligohydridoethylsilazane (CH$_3$SiHNH)$_n$ 100 ml (0.97 mol) of methyldichlorosilane were dissolved in 800 ml of absolute THF, and ammonia was passed in (flow rate: 0.5 l/min) for 3 hours. The reaction temperature was kept in the range 20° to 25° C. by cooling using an ice bath. In order to complete the reaction, the mixture was stirred at room temperature for 1 hour and the ammonium chloride was subsequently separated off under argon. The precipitate was washed twice with 350 ml of THF in each case, and the combined THF solutions were evaporated under reduced pressure. A clear, relatively mobile oil of (CH$_3$SiHNH)$_n$ was obtained in a yield of 44.5 g=78% theory.

Example 1

0.1 Mol of oligohydridomethylsilazane (CH$_3$SiHNH)$_n$ (number of moles based on the monomer unit in parentheses) was dissolved under nitrogen in 40 ml of THF in a round-bottomed flask equipped with reflux condenser and stirrer, and the mixture was heated to reflux. A constant, slow stream of nitrogen was passed over the mixture, and the exhaust gas was passed into chlorine bleaching lye, where the volatile, strong-smelling sulfur compounds produced during the reaction with sulfur were converted into odorless oxidation products.

0.07 Mole of sulfur was added in portions. The CH$_3$SiHNH:sulfur ratio was thus 1:0.7.

The sulfur dissolved completely to form a yellow solution. The color disappeared slowly to the extent to which the sulfur reacted with the SiH groups, i.e. over the course of 2 hours.

The mixture was then allowed to cool, and the solvent was removed by distillation under reduced pressure at room temperature. 6.1 g of a solid, white residue remained. This had an Si:N ratio 1:0.83 and a sulfur content of 8% by weight, to which the following structure corresponds:

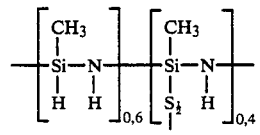

The 6.1 g of the polymeric hydridothiosilazane obtained thus correspond to a yield of 94%.

What is claimed is:

1. A process for the preparation of a polymeric hydridothiosilazane, which comprises reacting an oligohydridoalkylsilazane of the formula (RSiHNH)$_n$ in which n is approximately 3 to 12 and R is C$_1$-C$_6$-alkyl or C$_2$-C$_6$alkenyl, with elemental sulfur in an ether as solvent at 30° to 120° C.

2. A process for the preparation of a polymeric hydridothiosilazane, which comprises reacting an oligohydridoalkylsilazane obtained by reacting a dichlorohydridoalkylsilane RSiHCl$_2$ with NH$_3$, with elemental sulfur in an ether as a solvent at 30° to 120° C., where R is C$_1$-C$_6$-alkyl or C$_2$-C$_6$-alkenyl.

3. The process as claimed in claim 1 or 2, wherein R is methyl or vinyl.

4. The process as claimed in claim 1, wherein the molar ratio between sulfur and an RSiHNH unit of the oligohydridoalkylsilazane is 0.1:1 to 1:1.

5. A polymeric hydriodothiosilazane of the formula

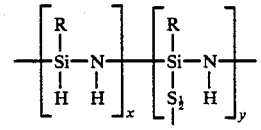

where R is C$_1$-C$_6$-alkyl or C$_2$-C$_6$-alkenyl and x and y denote the molar fractions of the two structural, and x+y=1 units.

6. A polymeric hydriodothiosilazane as claimed in claim 5, wherein y is 0.6 to 0.8.

7. A polymeric hydriodothiosilazane as claimed in claim 5, wherein R is methyl or vinyl.

8. A polymeric hydridothiosilazane obtainable by the process as claimed in claim 1.

* * * * *

UNITED STATES PATENT AND TRADEMARK OFFICE
CERTIFICATE OF CORRECTION

PATENT NO. : 4,952,670
DATED : August 28, 1990
INVENTOR(S) : TILO VAAHS, ET AL.

It is certified that error appears in the above-identified patent and that said Letters Patent is hereby corrected as shown below:

At Column 2, Line 11, "Rühumann" should read

-- Rühlmann -- .

At Column 2, Line 44, "o&" should read -- of -- .

At Column 5, Line 1, "resction" should read -- reaction -- .

At Column 5, Line 15, "oligohydridoethylsilazane" should read

-- oligohydridomethylsilazane -- .

In Claim 5, Column 6, Line 33, "hydriodothiosilazane"

should read -- hydridothiosilazane -- .

In Claim 5, Column 6, Lines 44-45, "structural, and x + y = 1 units." should read -- structural units, and x + y = 1.--

UNITED STATES PATENT AND TRADEMARK OFFICE
CERTIFICATE OF CORRECTION

PATENT NO. : 4,952,670
DATED : August 28, 1990
INVENTOR(S) : TILO VAAHS, ET AL.

It is certified that error appears in the above-identified patent and that said Letters Patent is hereby corrected as shown below:

In Claim 6, Column 6, Line 46, "hydriodothiosilazane" should read -- hydridothiosilazane -- .

In Claim 7, Column 6, Line 48, "hydriodothiosilazane" should read -- hydridothiosilazane -- .

Signed and Sealed this

Twenty-eighth Day of January, 1992

Attest:

HARRY F. MANBECK, JR.

*Attesting Officer*   *Commissioner of Patents and Trademarks*